(12) United States Patent
Knoll et al.

(10) Patent No.: US 11,975,826 B2
(45) Date of Patent: May 7, 2024

(54) ELECTRIC TILTROTOR AIRCRAFT WITH FIXED MOTORS

(71) Applicant: Bell Textron Inc., Fort Worth, TX (US)

(72) Inventors: Jonathan Andrew Knoll, Burleson, TX (US); George Matthew Thompson, Lewisville, TX (US); Charles Hubert Speller, Flower Mound, TX (US); Grant Michael Beall, Arlington, TX (US)

(73) Assignee: Textron Innovations Inc, Providence, RI (US)

( * ) Notice: Subject to any disclaimer, the term of this patent is extended or adjusted under 35 U.S.C. 154(b) by 54 days.

(21) Appl. No.: 17/163,785

(22) Filed: Feb. 1, 2021

(65) Prior Publication Data
US 2022/0242557 A1    Aug. 4, 2022

(51) Int. Cl.
*B64C 27/28* (2006.01)
*B64C 29/00* (2006.01)

(52) U.S. Cl.
CPC .......... *B64C 27/28* (2013.01); *B64C 29/0033* (2013.01)

(58) Field of Classification Search
CPC .................................................. B64C 29/0033
See application file for complete search history.

(56) References Cited

U.S. PATENT DOCUMENTS

| | | | |
|---|---|---|---|
| 10,065,743 B2 | 9/2018 | King et al. | |
| 10,421,540 B1* | 9/2019 | Koelzer | B64C 27/08 |
| 2006/0202081 A1* | 9/2006 | Milde, Jr. | B64C 3/56 244/12.1 |
| 2016/0122039 A1 | 5/2016 | Ehinger et al. | |
| 2017/0158323 A1 | 6/2017 | Ross et al. | |
| 2017/0190435 A1 | 7/2017 | Kobayashi et al. | |
| 2017/0217595 A1 | 8/2017 | Baldwin et al. | |
| 2019/0071174 A1* | 3/2019 | Burigo | B64C 29/0016 |
| 2019/0276142 A1 | 9/2019 | Przybyla | |

(Continued)

FOREIGN PATENT DOCUMENTS

| | | |
|---|---|---|
| EP | 3369655 A1 | 9/2018 |
| EP | 3564122 A1 | 11/2019 |

OTHER PUBLICATIONS

EPO Search Report issued in EP Application 21207940.4 dated Apr. 13, 2022, 4 pages.

*Primary Examiner* — Tien Q Dinh
*Assistant Examiner* — William L Gmoser
(74) *Attorney, Agent, or Firm* — Akona IP PC

(57) ABSTRACT

A rotor system for an aircraft includes an open rotor assembly comprising an open rotor assembly comprising a plurality of rotor blades connected to a rotor mast, wherein the rotor assembly is tiltable relative to a wing of the aircraft between a first position corresponding to an airplane mode of the aircraft and a second position corresponding to a helicopter mode of the aircraft; and a drive system for providing rotational energy to the open rotor assembly via the rotor mast. The drive system includes at least one electric motor for generating rotational energy to a motor shaft; and a gearbox connected to receive rotational energy from the at least one electric motor via the motor shaft and to provide rotational energy to the rotor mast via a rotor shaft, wherein the at least one electric motor is fixed relative to the wing of the aircraft.

14 Claims, 12 Drawing Sheets

(56) References Cited

U.S. PATENT DOCUMENTS

| | | | |
|---|---|---|---|
| 2019/0337629 A1* | 11/2019 | Gilliland | ................ B64D 27/10 |
| 2019/0389572 A1 | 12/2019 | Gilliland et al. | |
| 2020/0031488 A1 | 1/2020 | King et al. | |
| 2020/0172235 A1 | 6/2020 | Nissen et al. | |
| 2020/0255136 A1* | 8/2020 | Karem | ................... B64U 30/20 |

* cited by examiner

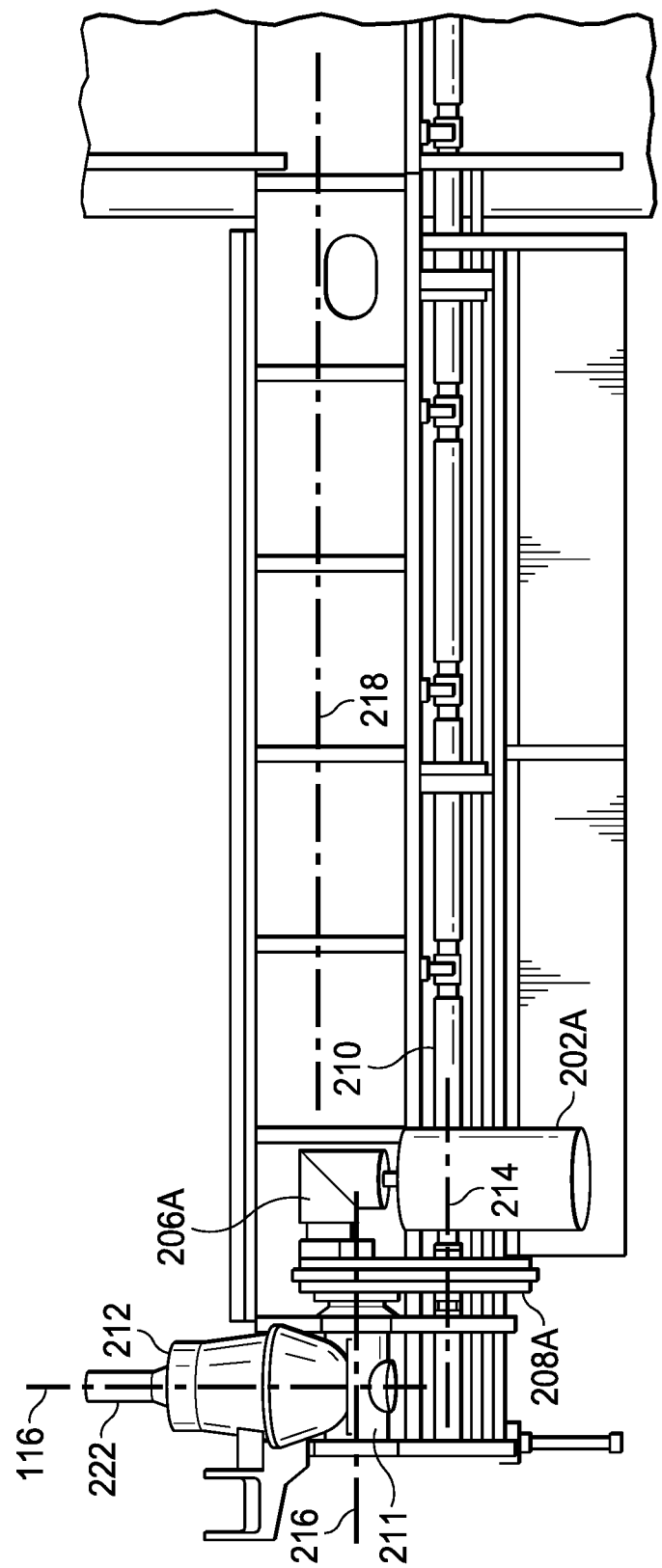

ELECTRIC TILTROTOR AIRCRAFT WITH FIXED MOTORS

TECHNICAL FIELD

This disclosure relates in general to the field of tiltrotor aircraft and, more particularly, though not exclusively, to fixed motors for such aircraft.

BACKGROUND

An electric vertical takeoff and landing (eVTOL) is a type of aircraft that uses electric power to supply rotational energy in an aircraft propulsion system for enabling the aircraft to hover, take off, and land vertically. Because of their versatility and lack of a need for a runway, eVTOLs are particularly useful for providing urban air mobility. As used herein, the term eVTOL also includes VTOLs that use hybrid electric propulsion systems. One particular type of eVTOL is an electric tiltrotor aircraft.

SUMMARY

One embodiment is a rotor system for an aircraft including an open rotor assembly comprising a plurality of rotor blades connected to a rotor mast via a yoke, wherein the rotor assembly is tiltable relative to a wing of the aircraft between a first position corresponding to an airplane mode of the aircraft and a second position corresponding to a helicopter mode of the aircraft; and a drive system for providing rotational energy to the open rotor assembly via the rotor mast, the drive system comprising at least one electric motor for providing rotational energy to a motor shaft and a gearbox connected to the motor shaft for receiving rotational energy from the at least one electric motor via the motor shaft and providing rotational energy to the rotor mast via a rotor shaft; wherein the at least one electric motor is fixed relative to the wing of the aircraft.

Another embodiment is an aircraft comprising a rotor system, the rotor system comprising an open rotor assembly comprising a plurality of rotor blades connected to a rotor mast via a yoke, wherein the rotor assembly is tiltable relative to a wing of the aircraft between a first position corresponding to an airplane mode of the aircraft and a second position corresponding to a helicopter mode of the aircraft; and a drive system for providing rotational energy to the open rotor assembly via the rotor mast. The drive system includes at least one electric motor for providing rotational energy to a motor shaft; and a gearbox connected to the motor shaft for receiving rotational energy from the at least one electric motor via the motor shaft and providing rotational energy to the rotor mast via a rotor shaft. The at least one electric motor is fixed relative to the wing of the aircraft.

Yet another embodiment is a drive system for providing rotational energy to an open rotor assembly of a rotor craft, the drive system comprising at least one electric motor for providing rotational energy to a motor shaft; and a gearbox connected to the motor shaft for receiving rotational energy from the at least one electric motor via the motor shaft and providing rotational energy to the rotor mast via a rotor shaft. The at least one electric motor is fixed relative to a wing of the aircraft and the rotor assembly is tiltable relative to a wing of the aircraft between a first position corresponding to an airplane mode of the aircraft and a second position corresponding to a helicopter mode of the aircraft.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements:

FIGS. 7A-7E are schematic illustrations of alternative configurations of the aircraft of FIGS. 1A and 1B respectively showing the fixed motors in different locations relative to the rotors in accordance with embodiments described herein.

DETAILED DESCRIPTION

Figure 1A:
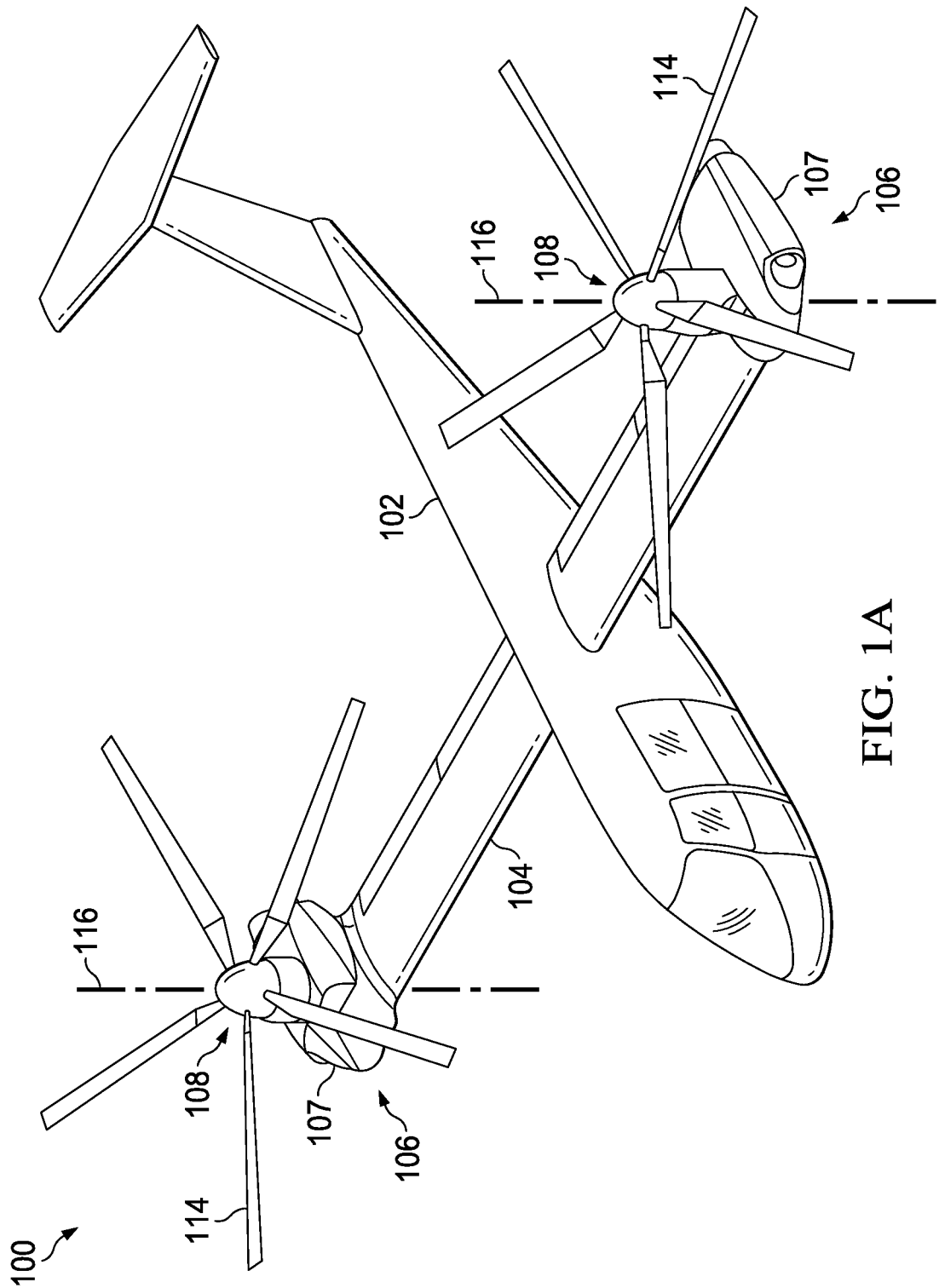
FIGS. 1A-1B illustrate an electric tiltrotor aircraft with fixed motors in accordance with embodiments described herein.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Described herein is a drive system for an electric tiltrotor aircraft. In accordance with features of embodiments described herein, the drive system includes one or more fixed electric motors coupled to an off-axis tilting gearbox. Tilting of the rotor assemblies takes place with respect to the stationary motors and wing or other stationary structure of the aircraft.

Figure 1B:
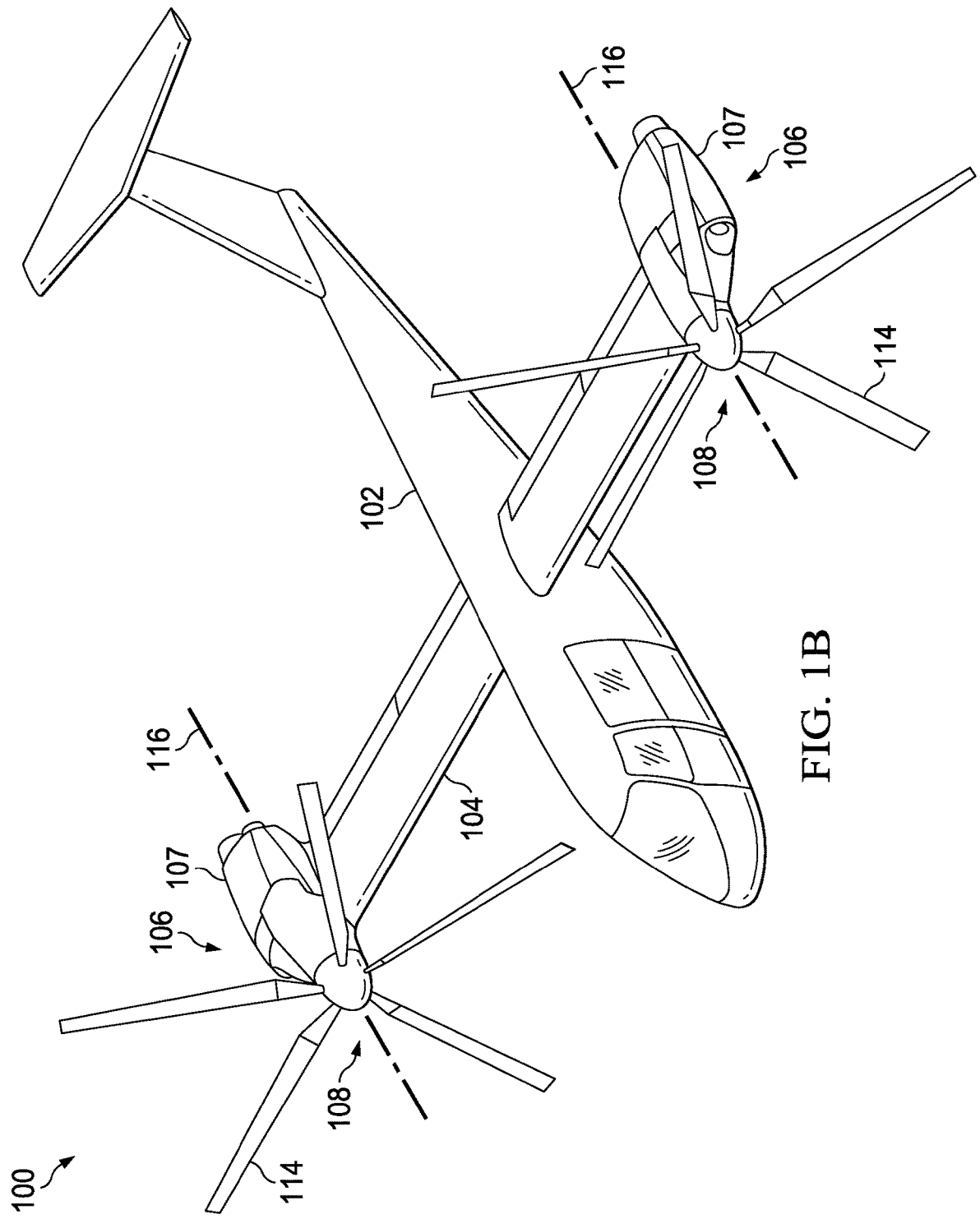
Figure 2:
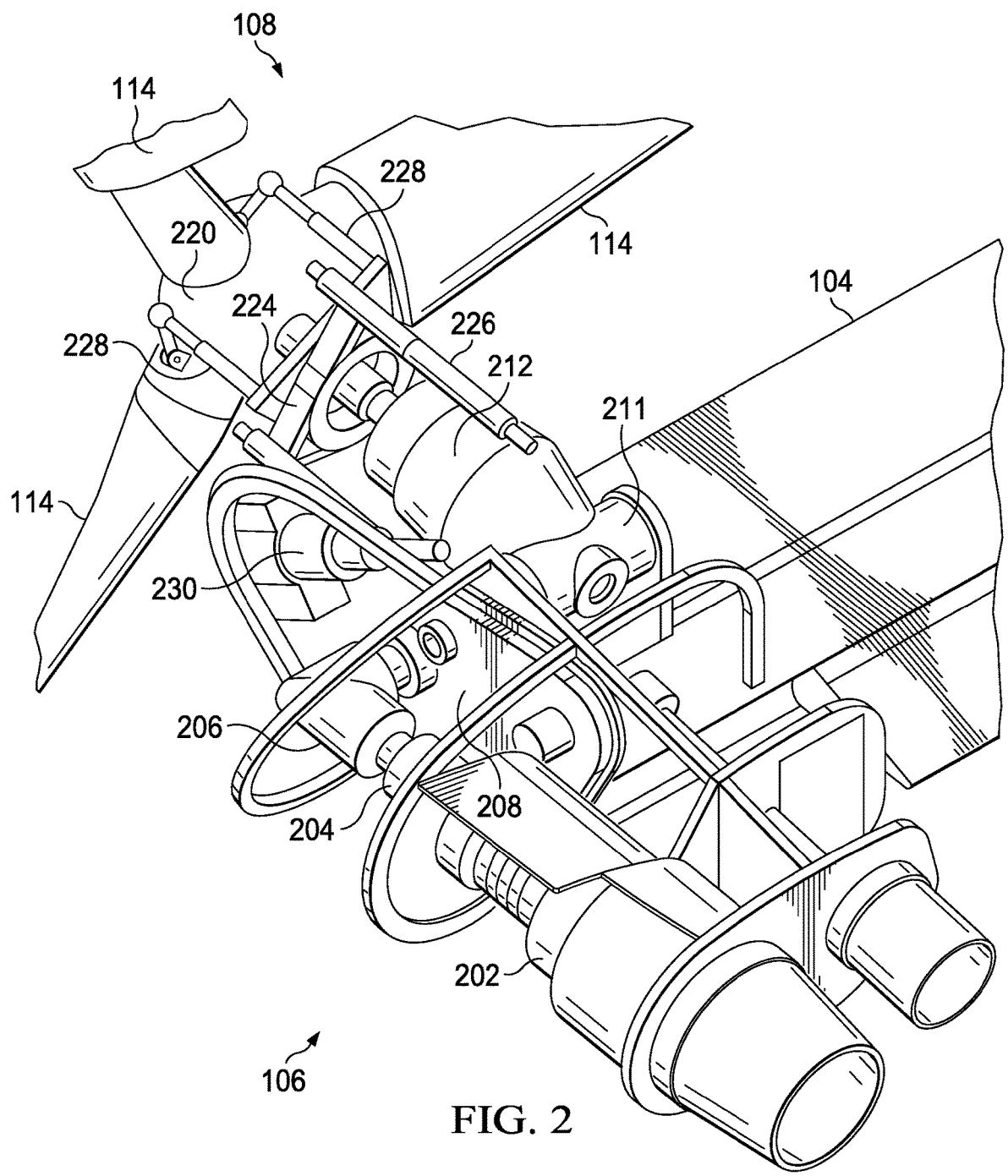
FIG. 2 illustrates an example arrangement of rotor propulsion system of aircraft shown in FIGS. 1A-1B.
Figure 3:
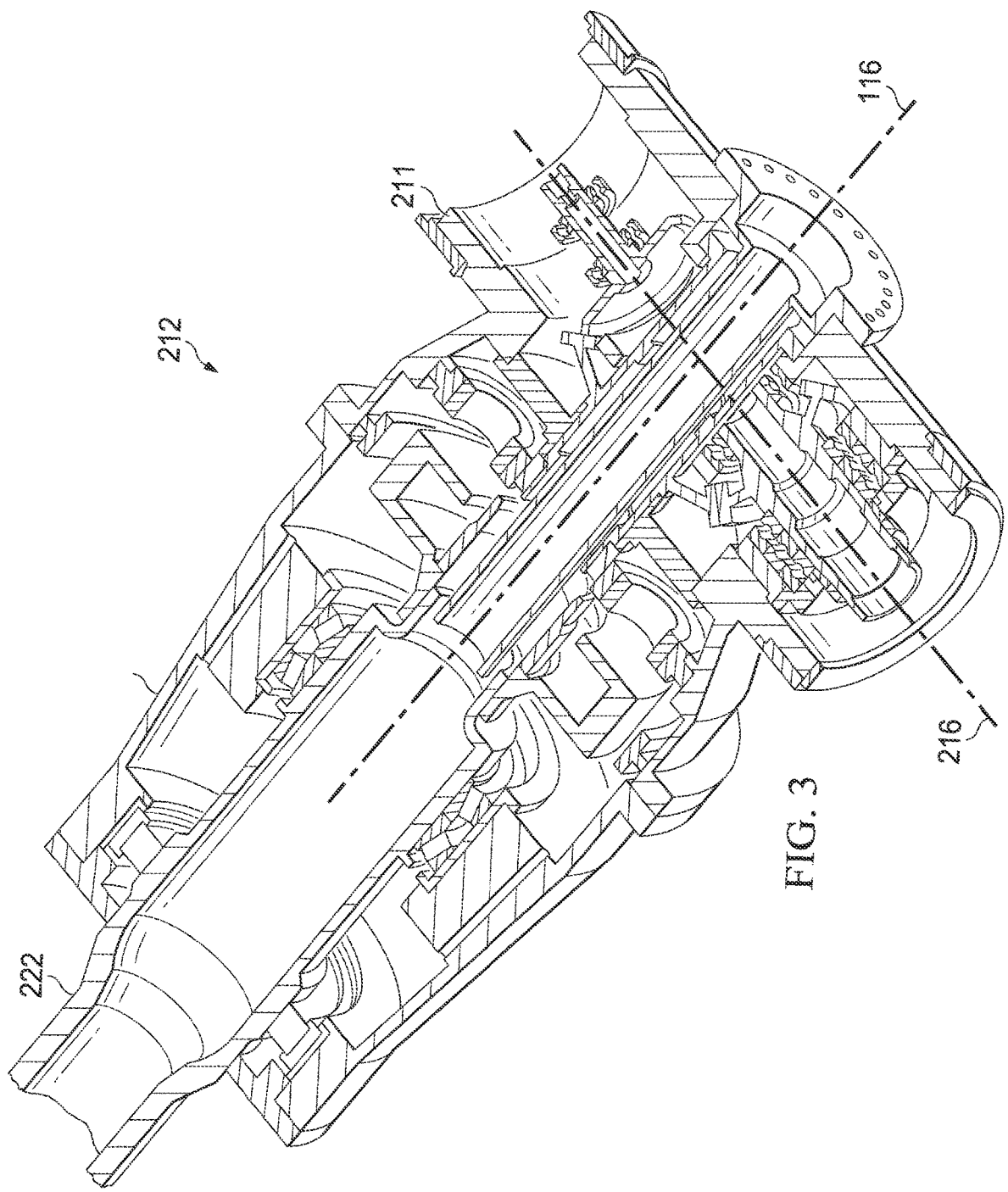
FIGS. 3-5 are schematic illustrations of portions of the aircraft of FIGS. 1A and 1B.

FIGS. 1A and 1B illustrate an example electric tiltrotor aircraft 100 that is convertible between a helicopter mode (shown in FIG. 1A), which allows for vertical takeoff and landing, hovering, and low speed directional movement, and an airplane mode (shown in FIG. 1B), which allows for forward flight as well as horizontal takeoff and landing. Aircraft 100 includes a fuselage 102, wing 104, and a propulsion systems 106 rotatably coupled to wing 104 on opposite sides of the fuselage 102. Each propulsion system 106 includes a drive system housing 107 and a rotatable open rotor assembly 108 including a plurality of rotor blades 114 connected to a rotor mast (FIG. 2) and configured to rotate about a rotor axis 116. Rotation of rotor blades 114 about rotor axis 116 generates lift while operating in helicopter mode and thrust while operating in airplane mode. Each housing 107 may house one or more electric motors therein configured to produce rotational energy that drives the rotation of rotor assembly 108. Alternatively, each housing 107 may house a gearbox therein that drives the rotation of rotor assembly 108, wherein the gearbox receives rotational energy from a driveshaft.

The position of rotor assemblies 108, as well as the pitch of individual rotor blades 114, can be selectively controlled in order to selectively control direction, thrust, and lift of aircraft 100. Propulsion systems 106 are each convertible, relative to fuselage 102, between a vertical position, as shown in FIG. 1A, and a horizontal position, as shown in FIG. 1B. Propulsion systems 106 are in the vertical position during vertical takeoff and landing mode. Vertical takeoff and landing mode may be considered to include hover operations of aircraft 100. Propulsion systems 106 are in the horizontal position during forward flight mode, in which aircraft 100 is in forward flight. In forward flight mode, propulsion systems 106 direct their respective thrusts in the aft direction to propel aircraft 100 forward. Aircraft 100 is operable to fly in all directions during the vertical takeoff and landing mode configuration of FIG. 1A, although faster forward flight is achievable while in the forward flight mode configuration of FIG. 1B. Propulsion systems 106 may be tiltable between the vertical and horizontal positions by a rotatable shafts (not shown) extending through wing 104 on opposite sides of fuselage 102 that are rotatable in response to commands originating from a pilot and/or a flight control system. Each of the propulsion systems 106 utilizes an electric motor and gearbox unit (described below) disposed within a respective drive system housing 107 as a power source to rotate the respective rotor assembly 108 about rotor axis via a rotor mast.

Propulsion systems 106 are illustrated in the context of aircraft 100; however, propulsion systems 106 may be implemented on other types of tiltrotor aircraft. For example, an alternative embodiment may include a quad tiltrotor that has an additional wing member aft of wing 104 that can have additional propulsion systems similar to propulsion systems 106. In another embodiment, propulsion systems 106 may be implemented in connection with an unmanned version of aircraft 100. Further, propulsion systems 106 may be integrated into a variety of tiltrotor aircraft configurations.

Referring now also to FIGS. 2-5, propulsion systems 106 are disclosed in further detail. As shown in FIGS. 2-5, propulsion system 106 includes one or more electric motors 202 that are fixed relative to wing 104. A motor output shaft 204 transfers power from motors 202 to a spiral bevel (or 90 degree) gearbox 206 that includes spiral bevel gears to change torque direction by 90 degrees from motors 202 to a fixed gearbox 208 via a clutch. Fixed gearbox 208 includes a plurality of gears, such as helical gears, in a gear train that are coupled to an interconnect drive shaft 210 and a quill shaft. Torque is transferred to an input in spindle gearbox 211 of a proprotor gearbox 212 through the quill shaft.

Figure 4:
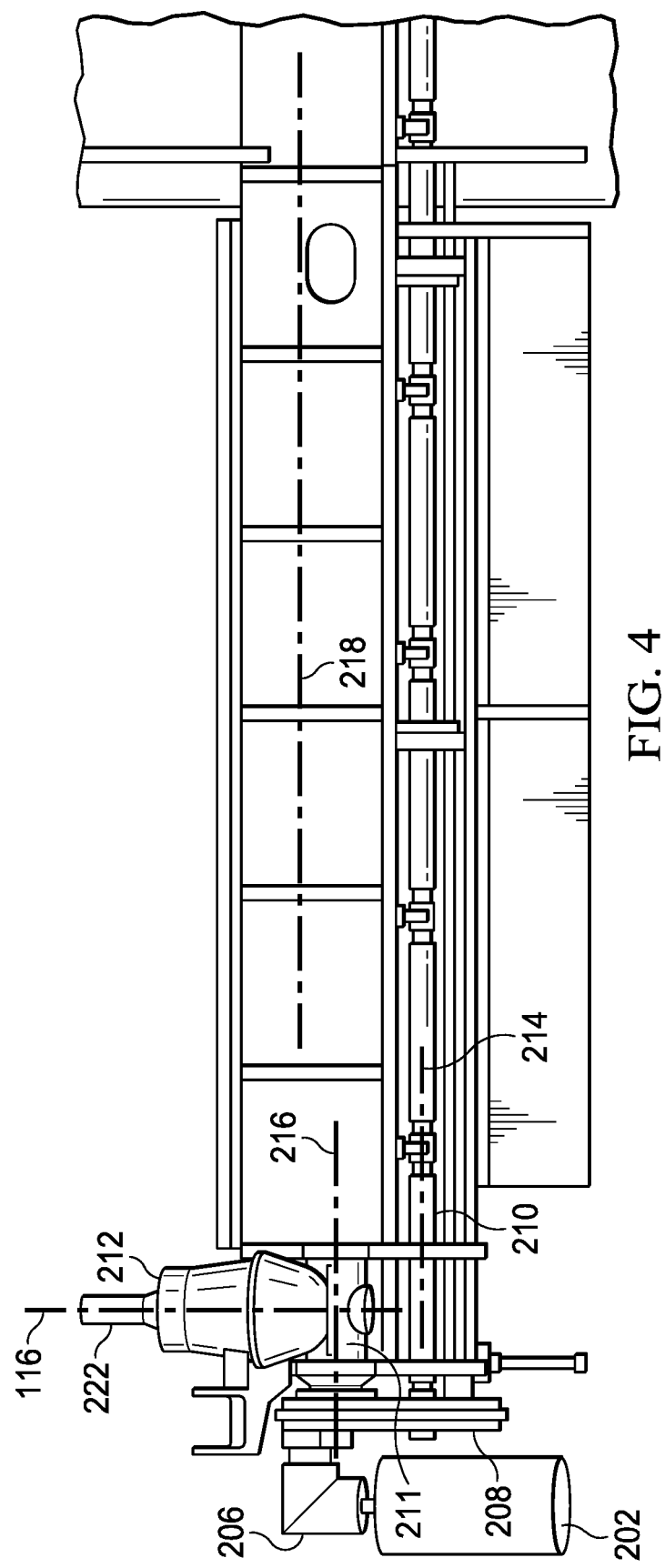
Figure 5:
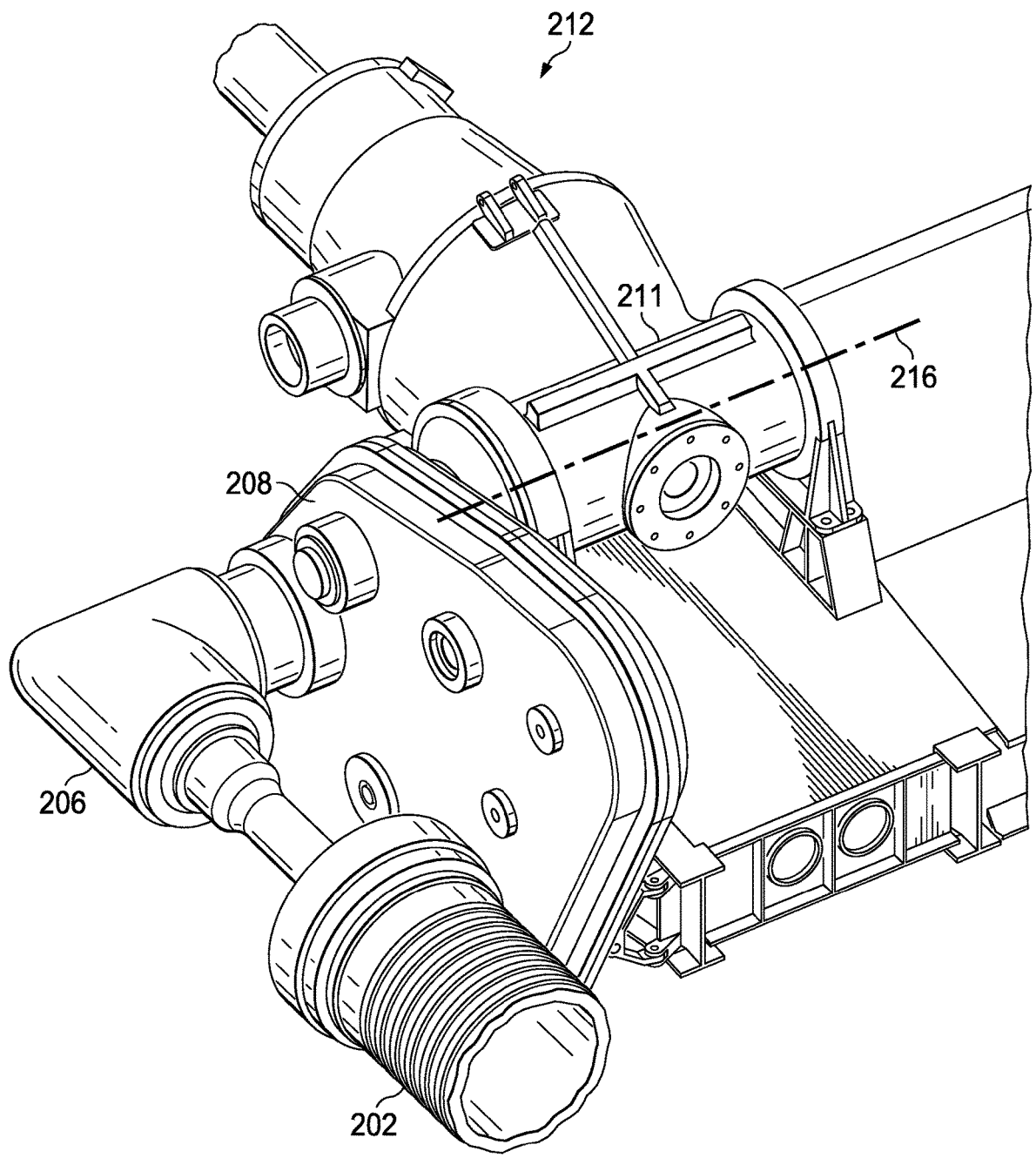

The interconnect drive shaft 210 provides a torque path that may enable the motors 202 of one of the propulsion systems 106 to provide torque to both rotor assemblies 108 in the event of a failure of the motors 202 of the other one of the propulsion systems 106. In the illustrated embodiment, interconnect drive shaft 210 has a rotational axis 214 that is vertically lower and horizontally aft of the conversion axis 216 of the spindle gearbox 211. Conversion axis 216 is parallel to a lengthwise axis 218 of wing 104. Referring in particular to FIG. 4, interconnect drive shaft 210 includes a plurality of segments that share a common rotational axis 214. Location of interconnect drive shaft 210 aft of the aft wing spar provides for optimal integration with fixed gearbox 208 without interfering with the primary torque transfer in the quill shaft between fixed gearbox 208 and spindle gearbox 211; as such, the conversion axis 216 of spindle gearbox 211 is parallel to the rotational axis 214 and interconnect drive shaft 210, but located forward and above rotational axis 214.

Motors 202 can be housed and supported in a drive system housing 107, which may include a variety of structures and systems to support and facilitate the operation of motors 202. The rotor assembly 108 of propulsion system 106 can include a plurality of rotor blades 114 coupled to a yoke 220. The yoke 220 can be coupled to a mast 222. Mast 222 is coupled to proprotor gearbox 212. It should be appreciated that rotor assembly 108 can include other components, such as a swashplate 224 that is selectively actuated by a plurality of actuators 226 to selectively control the pitch of rotor blades 114 via pitch links 228.

Proprotor gearbox 212 is configured to transfer power and reduce speed to mast 222. Further, proprotor gearbox 212 provides operational support of rotor assembly 108. It should be appreciated that proprotor gearbox 212 can include any bearings, lubrication systems, and other gearbox related components that may be beneficial for operation.

During operation, a conversion actuator 230 (shown at least in FIG. 2) can be actuated so as to selectively rotate proprotor gearbox 212 about a conversion axis 216, which in turn selectively positions rotor assembly 108 between helicopter mode (shown in FIG. 1A) and airplane mode (shown in FIG. 1B).

The configuration of propulsion system 106 as illustrated herein provides flexibility in arrangement of electric motors 202. For example, as shown and described below, motors 202 may be configured as cylinders in series, stacked pancakes, or a flat pack. Additionally, although illustrated as being located within drive system housing 107, motors 202 may additionally and/or alternatively be located in the wing 104 or fuselage 102. Moreover, it may be advantageous to maintain the motors in a fixed, non-tiltable orientation for heat rejection and passenger clearance while the proprotor gearbox 212 and rotor assembly 108 rotates about conversion axis 216.

Figure 6A:
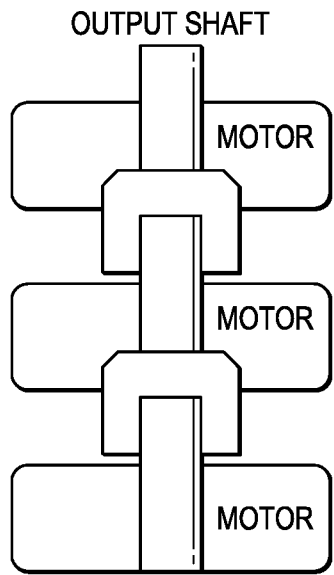
FIGS. 6A-6C illustrate example electric motor configurations for use in the rotor propulsion system shown in FIG. 2.
Figure 6B:
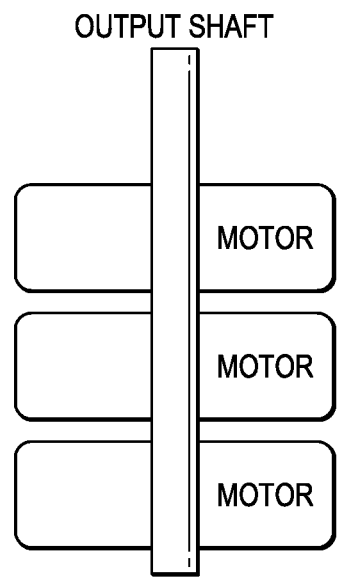
Figure 6C:
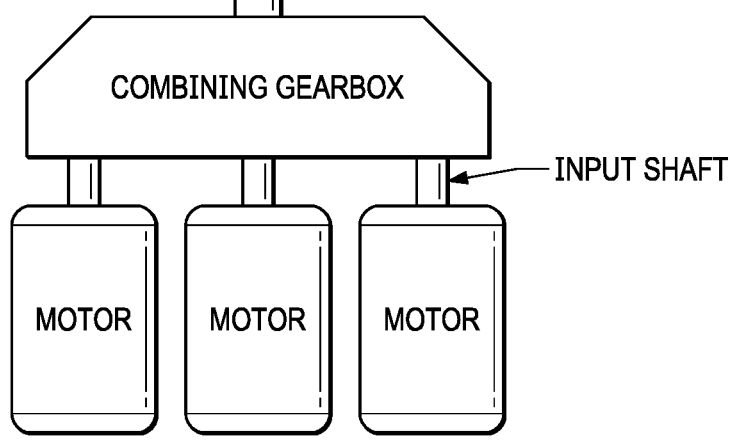

Referring now to FIGS. 6A-6C, as indicated above, motors may be configured as cylinders in series (FIG. 6A), stacked pancakes (FIG. 6B), or a flat pack (FIG. 6C). Referring first to FIG. 6A, in the series arrangement, motors are stacked in line with the output shaft of the first motor in the series engaging the input shaft of the next motor in the series. The shafts may be engaged with one another by way of splines or other another appropriate method. Referring to FIG. 6B, in a pancake arrangement, multiple motors are stacked and engage a single output shaft. Motors can utilize different methods of engaging the output shaft, such as splines, bolted flanges, or other means. Finally, referring to FIG. 6C, in a flat pack arrangement, a combining gearbox is provided to combine inputs from the motors to a single output shaft.

Figure 7B:
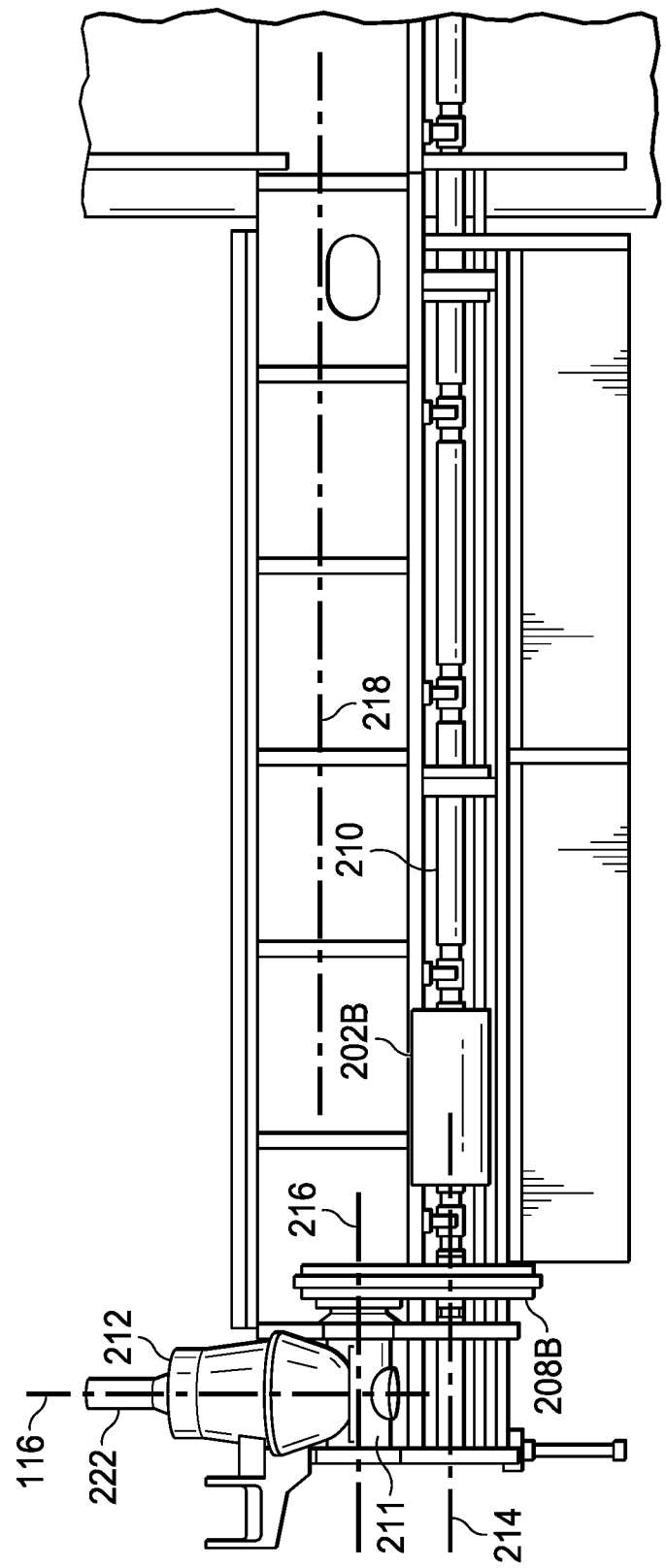
Figure 7C:
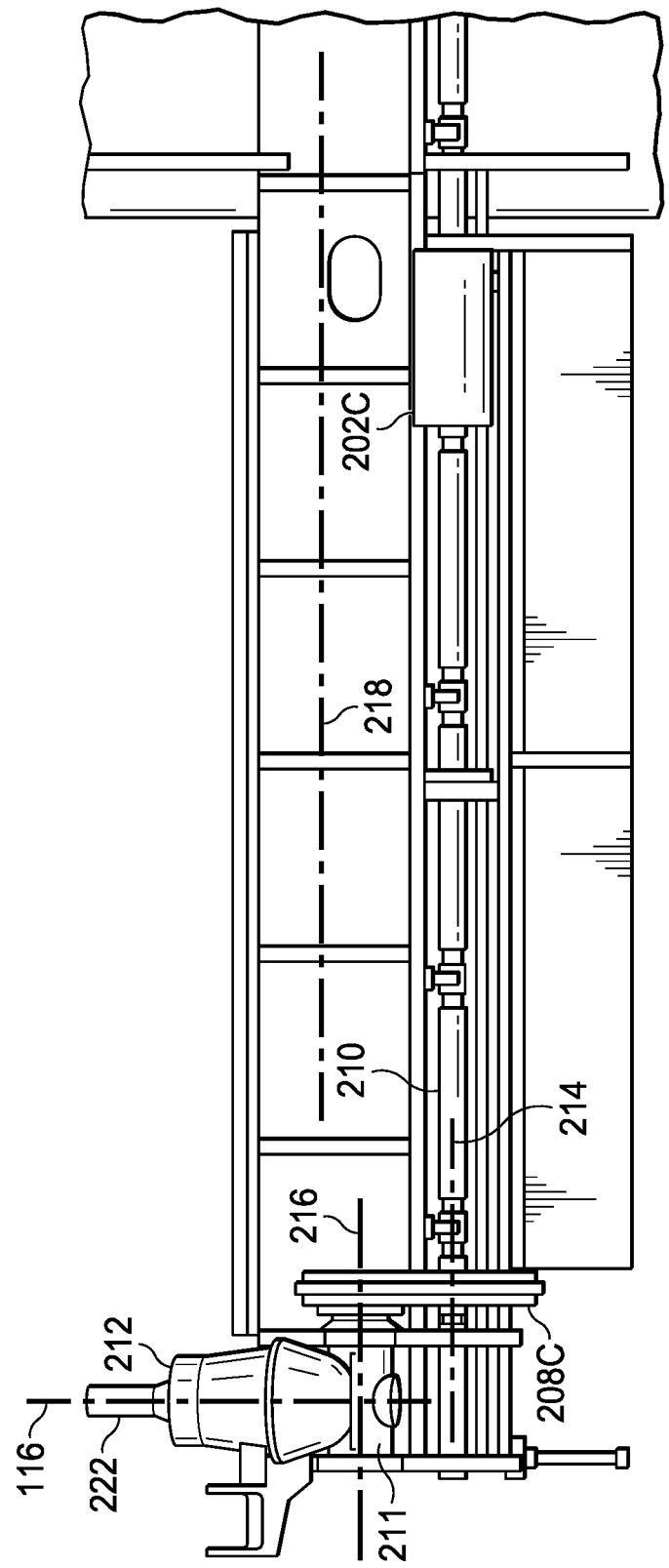
Figure 7D:
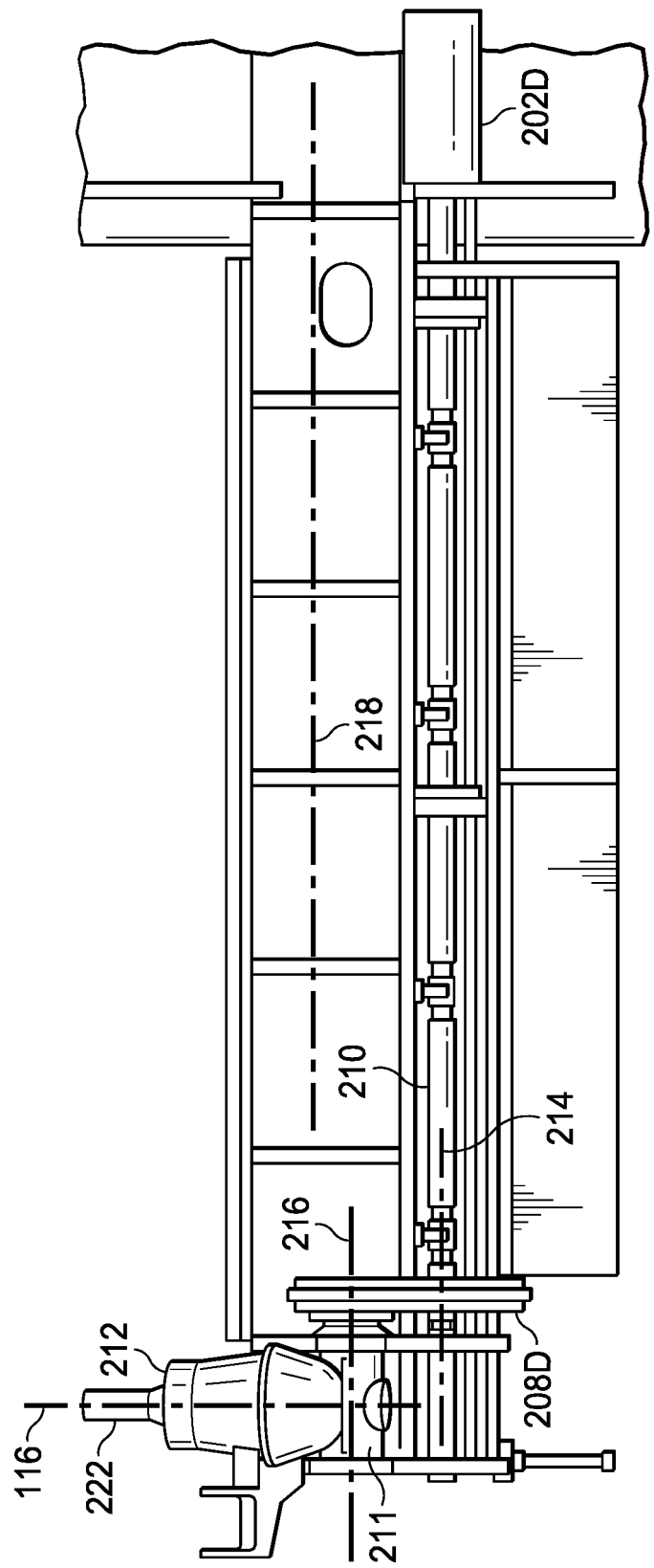
Figure 7E:
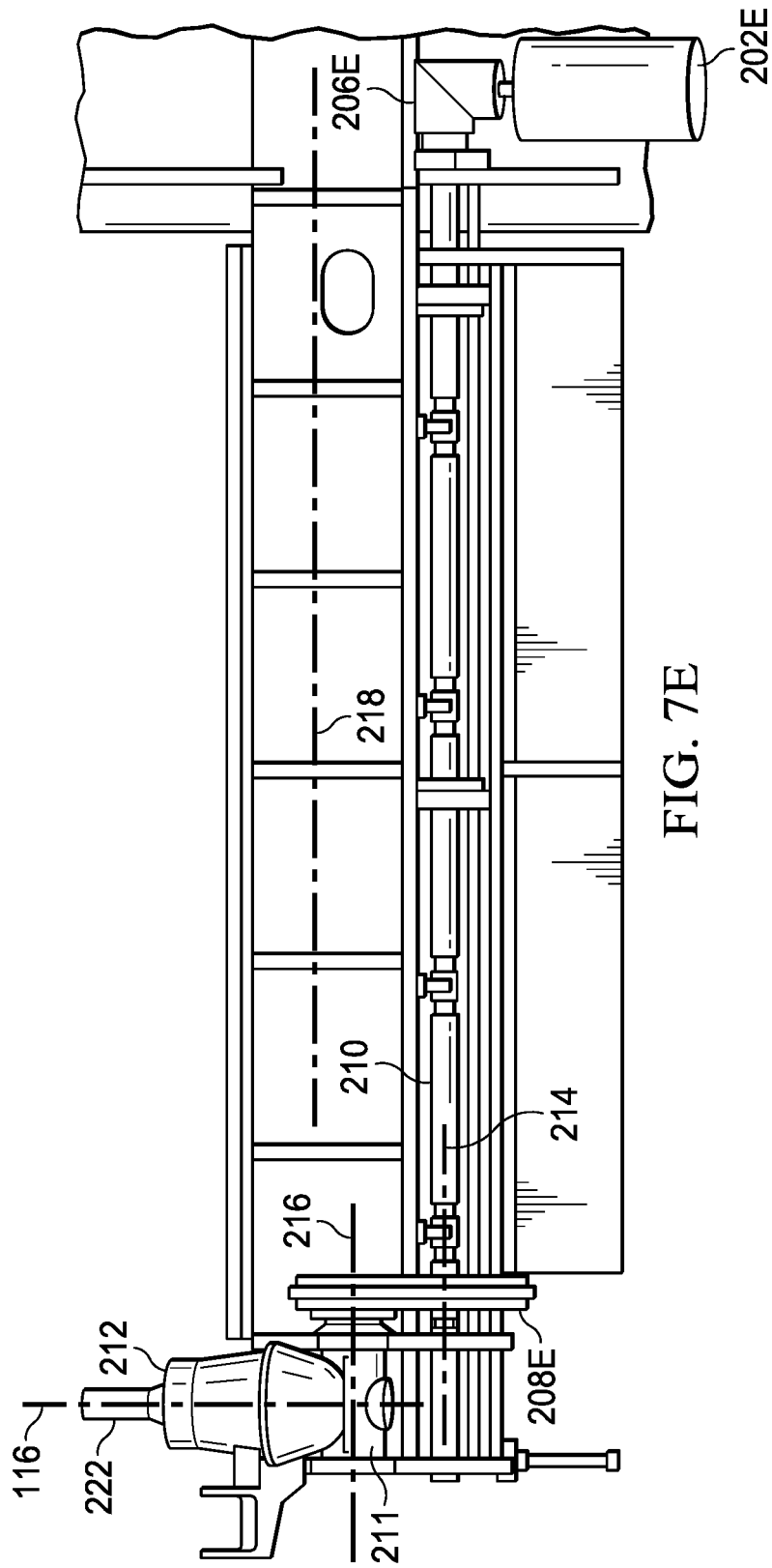

FIGS. 7A-7E illustrate a number of example alternative arrangements of the aircraft 100 in which the fixed motors may be located in different locations within the aircraft than as depicted in FIG. 4 in accordance with features of embodiments described herein. In one alternative arrangement, as shown in FIG. 7A, motors 202A, 90 degree gearbox 206A, and gearbox 208A may be located inboard of the rotor mast 222. In another alternative arrangement, as shown in FIG. 7B, motors 202B may be located near an outboard end of the wing and may drive interconnect drive shaft 210 as an input to gearbox 208B. In yet another alternative embodiment, as shown in FIG. 7C, motors 202C may be located near the inboard end of the wing and may be configured to drive interconnect drive shaft 210 as an input to gearbox 208C. In still another alternative embodiment, as shown in FIG. 7E, motors 202D may be located within fuselage and may drive interconnect shaft 210 as an input to gearbox 208D. Finally, in yet another alternative embodiment, as shown in FIG. 7E, motors 202E may be located within the fuselage and may drive interconnect shaft 210 via 90 degree gearbox 206E as an input to gearbox 208E. It will be recognized that the configurations illustrated in FIGS. 7A-7E are for purposes of example only and that the motors may be disposed in a variety of other locations within aircraft 100 in accordance with teachings described herein.

It should be appreciated that aircraft illustrated herein, such as aircraft 100, is merely illustrative of a variety of aircraft that can implement the embodiments disclosed herein. Indeed, the various embodiments of the electric drive system line replaceable unit described herein may be used on any aircraft that utilizes motors. Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, and the like. As such, those skilled in the art will recognize that the embodiments described herein for an electric drive system line replaceable unit can be integrated into a variety of aircraft configurations. It should be appreciated that even though aircraft are particularly well-suited to implement the embodiments of the present disclosure, non-aircraft vehicles and devices can also implement the embodiments.

The components of rotor assemblies 108 may comprise any materials suitable for use with an aircraft rotor. For example, rotor blades 114 and other components may comprise carbon fiber, fiberglass, or aluminum; and rotor masts 222 and other components may comprise steel or titanium. While rotor assemblies 108 are shown with five rotor blades 114, respectively, it should be understood that they may have as few as two rotor blades and may have more than five rotor blades. Still further, while only two rotor assemblies 108 are depicted, it will be recognized that embodiments described herein may be implemented in connection with any number of rotor assemblies.

Example 1 is a rotor system for an aircraft, the rotor system including an open rotor assembly comprising a plurality of rotor blades connected to a rotor mast, wherein the rotor assembly is tiltable relative to a wing of the aircraft between a first position corresponding to an airplane mode of the aircraft and a second position corresponding to a helicopter mode of the aircraft; and a drive system for providing rotational energy to the open rotor assembly via the rotor mast, the drive system comprising at least one electric motor for generating rotational energy to a motor shaft; and a gearbox connected to receive rotational energy from the at least one electric motor via the motor shaft and to provide rotational energy to the rotor mast via a rotor shaft; wherein the at least one electric motor is fixed relative to the wing of the aircraft.

In Example 2, the rotor system of Example 1 may further include the at least one electric motor including at least one of a plurality of electric motors arranged as cylinders in series, a plurality of electric motors comprising stacked pancakes, and a plurality of electric motors arranged as a flat pack.

In Example 3, the rotor system of any of Examples 1-2 may further include a nacelle in which at least a portion of the drive system is housed.

In Example 4, the rotor system of any of Examples 1-3 may further include a portion of the nacelle including the gearbox and supporting the rotor assembly being rotatably connected to the wing of the aircraft.

In Example 5, the rotor system of any of Examples 1-4 may further include the portion of the nacelle being tiltable between a first position corresponding to an airplane mode of the aircraft and a second position corresponding to a helicopter mode of the aircraft.

In Example 6, the rotor system of any of Examples 1-5 may further include the gearbox tilting with the nacelle between the first and second positions.

In Example 7, the rotor system of any of Examples 1-6 may further include the at least one electrical motor is housed within a non-rotating portion of the nacelle and is positioned outboard of the rotor mast.

In Example 8, the rotor system of any of Examples 1-7 may further include the at least one electrical motor being housed within a non-rotating portion of the nacelle and is positioned inboard of the rotor mast.

In Example 9, the rotor system of any of Examples 1-8 may further include the at least one electric motor being housed within the wing.

In Example 10, the rotor system of any of Examples 1-9 may further include the at least one electric motor being housed within the fuselage.

Example 11 is an aircraft comprising a rotor system, the rotor system including an open rotor assembly comprising a plurality of rotor blades connected to a rotor mast via a yoke, wherein the rotor assembly is tiltable relative to a wing of the aircraft between a first position corresponding to an airplane mode of the aircraft and a second position corresponding to a helicopter mode of the aircraft; and a drive system for providing rotational energy to the open rotor assembly via the rotor mast, the drive system comprising at least one electric motor for generating rotational energy to a motor shaft; and a gearbox connected to receive rotational energy from the at least one electric motor via the motor shaft and to provide rotational energy to the rotor mast via a rotor shaft; wherein the at least one electric motor is fixed relative to the wing of the aircraft.

In Example 12, the aircraft of Example 11 may further include the motor shaft and the rotor shaft being parallel to and offset from one another.

In Example 13, the aircraft of any of Examples 11-12 may further include the at least one electric motor including at least one of a plurality of electric motors arranged as cylinders in series, a plurality of electric motors comprising stacked pancakes, and a plurality of electric motors arranged as a flat pack.

In Example 14, the aircraft of any of Examples 11-13 may further include a nacelle in which the drive system is housed.

In Example 15, the aircraft of any of Examples 11-14 may further include a portion of the nacelle including the gearbox and supporting the rotor assembly is rotatably connected to the wing of the aircraft.

In Example 16, the aircraft of any of Examples 11-15 may further include the portion of the nacelle being tiltable between a first position corresponding to an airplane mode of the aircraft and a second position corresponding to a helicopter mode of the aircraft.

In Example 17, the aircraft of any of Examples 11-16 may further include the gearbox tilting with the nacelle between the first and second positions.

Example 18 may include a drive system for providing rotational energy to an open rotor assembly of a rotor craft, the drive system including at least one electric motor for generating rotational energy to a motor shaft; and a gearbox connected to receive rotational energy from the at least one electric motor via the motor shaft and to provide rotational energy to the rotor mast via a rotor shaft; wherein the at least one electric motor is fixed relative to a wing of the aircraft; and wherein the rotor assembly is tiltable relative to a wing of the aircraft between a first position corresponding to an airplane mode of the aircraft and a second position corresponding to a helicopter mode of the aircraft.

In Example 19, the drive system of Example 18 may further include the at least one electric motor including at least one of a plurality of electric motors arranged as cylinders in series, a plurality of electric motors comprising stacked pancakes, and a plurality of electric motors arranged as a flat pack.

In Example 20, the drive system of any of Examples 18-19 may further include a nacelle in which the drive system is housed, wherein a portion of the nacelle comprising the gearbox and supporting the rotor assembly is rotatable relative to the wing of the aircraft.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. An aircraft comprising:
    a fuselage;
    first and second wings connected to the fuselage;
    a first rotor system tiltable relative to the first wing between a first position corresponding to an airplane mode of the aircraft and a second position corresponding to a helicopter mode of the aircraft, the first rotor system comprising:
        a first open rotor assembly comprising a first plurality of rotor blades connected to a first rotor mast; and
        a first drive system for providing rotational energy to the first open rotor assembly via the first rotor mast, the first drive system comprising:
            a first transversely mounted electric motor housed within the first wing for generating rotational energy to a first motor shaft, wherein the first transversely mounted electric motor is fixed relative to the first wing; and
            a first gearbox having a single input through which the first motor shaft is received, the first gearbox connected to receive rotational energy from the first transversely mounted electric motor via the first motor shaft and to provide rotational energy to the first rotor mast via a first rotor shaft;
    a second rotor system tiltable relative to the second wing between the first position corresponding to the airplane mode of the aircraft and the second position corresponding to the helicopter mode of the aircraft, the second rotor system comprising:
        a second open rotor assembly comprising a second plurality of rotor blades connected to a second rotor mast; and
        a second drive system for providing rotational energy to the second open rotor assembly via the second rotor mast, the second drive system comprising:
            a second transversely mounted electric motor housed within the second wing for generating rotational energy to a second motor shaft, wherein the second transversely mounted electric motor is fixed relative to the second wing; and
            a second gearbox having a single input through which the second motor shaft is received, the second gearbox connected to receive rotational energy from the second transversely mounted electric motor via the second motor shaft and to provide rotational energy to the second rotor mast via a second rotor shaft; and
    an interconnect drive shaft connected between the first and second gearboxes, the interconnect drive shaft providing a torque path between the first transversely mounted electric motor and the second open rotor assembly.

2. The aircraft of claim 1, wherein the first motor shaft and the first rotor shaft are parallel to and offset from one another and the second motor shaft and the second rotor shaft are parallel to and offset from one another.

3. The aircraft of claim 1, wherein each of the first and second transversely mounted electric motors comprises at least one of a plurality of electric motors arranged as cylinders in series, a plurality of electric motors comprising stacked pancakes, and a plurality of electric motors arranged as a flat pack.

4. The aircraft of claim 1 further comprising a first nacelle in which the first drive system is housed and a second nacelle in which the second drive system is housed.

5. The aircraft of claim 4, wherein a portion of the first nacelle comprising the first gearbox and supporting the first open rotor assembly is rotatably connected to the first wing of the aircraft and a portion of the second nacelle comprising the second gearbox and supporting the second open rotor assembly is rotatably connected to the second wing of the aircraft.

6. The aircraft of claim 5, wherein the portion of the first nacelle and the portion of the second nacelle are each tiltable between the first position corresponding to the airplane mode of the aircraft and the second position corresponding to the helicopter mode of the aircraft.

7. The aircraft of claim 6, wherein the first gearbox tilts with the first nacelle between the first and second positions and the second gearbox tilts with the second nacelle between the first and second positions.

8. An aircraft comprising:
a fuselage;
first and second wings connected to opposite sides of the fuselage;
first and second rotor systems connected to first and second wings, the first and second rotor systems tiltable relative to the first and second wings between a first position corresponding to an airplane mode of the aircraft and a second position corresponding to a helicopter mode of the aircraft, each of the first and second rotor systems comprising:
  a rotor assembly comprising a plurality of rotor blades connected to a rotor mast; and
  a drive system for providing rotational energy to the rotor assembly via the rotor mast, the drive system comprising:
    a transversely mounted electric motor housed within one of the first and second wings for generating rotational energy to a motor shaft, wherein the transversely mounted electric motor is fixed relative to the one of the first and second wings; and
    a gearbox having a single input through which the motor shaft is received, the gearbox connected to receive rotational energy from the transversely mounted electric motor via the motor shaft and to provide rotational energy to the rotor mast via a rotor shaft;
an interconnect drive shaft connected between the gearboxes of the first and second rotor systems, the interconnect drive shaft providing a torque path between the transversely mounted electric motor of one of the first and second rotor systems and the drive system of the other one of the first and second rotor assemblies.

9. The aircraft of claim 8, wherein for each of the first and second rotor systems, the motor shaft and the rotor shaft are parallel to and offset from one another.

10. The aircraft of claim 8, wherein for each of the first and second rotor systems, the transversely mounted electric motor comprises at least one of a plurality of electric motors arranged as cylinders in series, a plurality of electric motors comprising stacked pancakes, and a plurality of electric motors arranged as a flat pack.

11. The aircraft of claim 8, further comprising nacelles in which the drive systems of the first and second rotor systems are housed.

12. The aircraft of claim 11, wherein for each of the nacelles, a portion of the nacelle comprising the gearbox and supporting the rotor assembly is rotatably connected to one of the first and second wings of the aircraft.

13. The aircraft of claim 12, wherein for each of the nacelles, the portion of the nacelle is tiltable between the first position corresponding to the airplane mode of the aircraft and the second position corresponding to the helicopter mode of the aircraft.

14. The aircraft of claim 13, wherein for each of the nacelles, the gearbox tilts with the nacelle between the first and second positions.

* * * * *